(12) United States Patent
Mei

(10) Patent No.: US 6,381,099 B1
(45) Date of Patent: Apr. 30, 2002

(54) WIRELESS SUSPENSION WITH INTERRUPTED LOAD BEAM

(75) Inventor: Shijin Mei, Temecula, CA (US)

(73) Assignee: Magnecomp Corporation, Temecula, CA (US)

( * ) Notice: Subject to any disclaimer, the term of this patent is extended or adjusted under 35 U.S.C. 154(b) by 0 days.

(21) Appl. No.: 09/556,853

(22) Filed: Apr. 21, 2000

Related U.S. Application Data

(60) Provisional application No. 60/138,709, filed on Jun. 11, 1999.

(51) Int. Cl.[7] ................................................. G11B 5/54
(52) U.S. Cl. ................................. 360/244.3; 360/245.8
(58) Field of Search ........................... 360/244.3, 245.8, 360/245.9, 244.8

(56) References Cited

U.S. PATENT DOCUMENTS

| | | | | |
|---|---|---|---|---|
| 5,594,607 A | * | 1/1997 | Erpelding et al. | 360/245.8 |
| 5,844,751 A | * | 12/1998 | Bennin et al. | 360/245.8 |
| 5,864,445 A | * | 1/1999 | Bennin et al. | 360/245.8 |
| 5,892,637 A | * | 4/1999 | Brooks, Jr. et al. | 360/245.8 |
| 5,901,017 A | * | 5/1999 | Sano et al. | 360/245.8 |

* cited by examiner

*Primary Examiner*—Jefferson Evans
(74) *Attorney, Agent, or Firm*—Louis J. Bachand

(57) ABSTRACT

In a disk drive suspension the conventional load beam spring section is replaced by the spring metal layer of the flexible conductor that forms the flexure providing more accurate spring function without the need of critical etching steps in the load beam spring section.

18 Claims, 3 Drawing Sheets

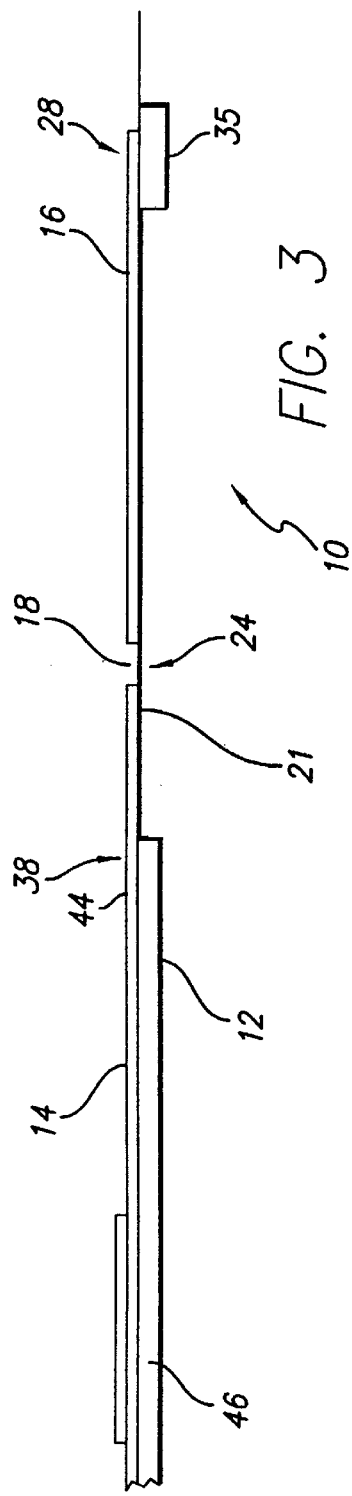
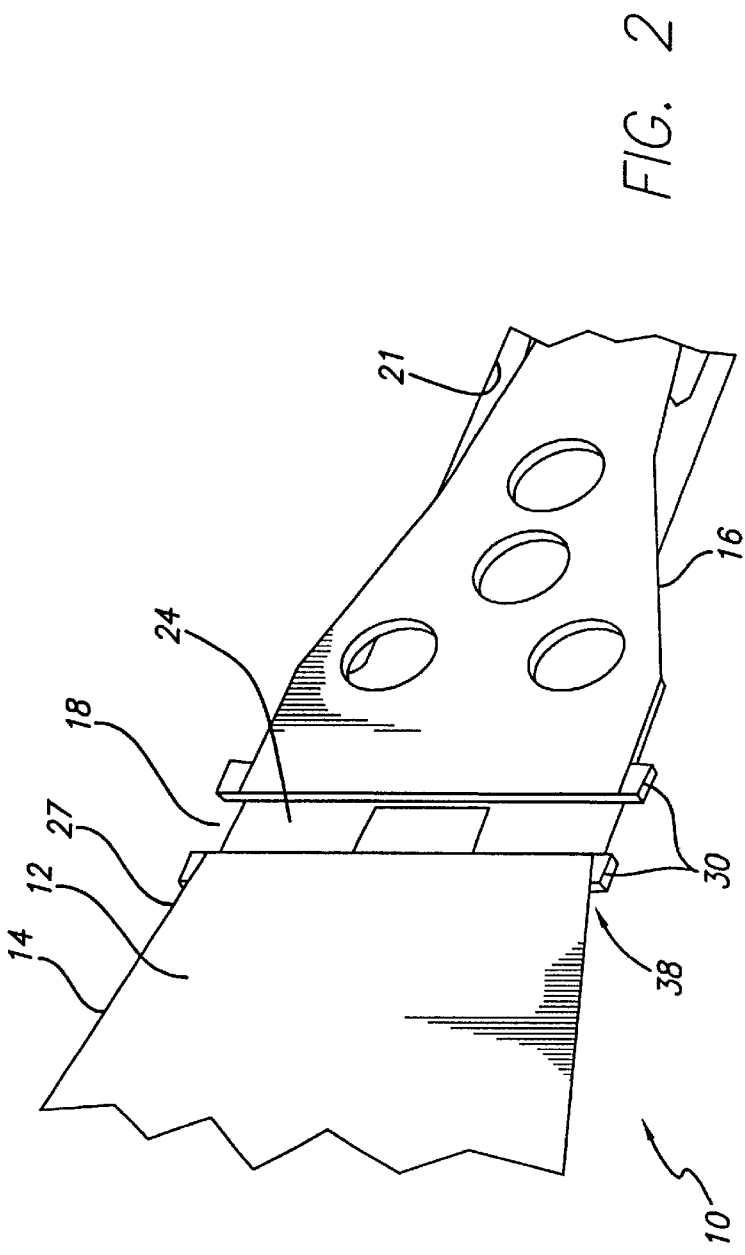

WIRELESS SUSPENSION WITH INTERRUPTED LOAD BEAM

CROSS REFERENCE TO RELATED APPLICATION

This application claims the benefit of United States Provisional Application Serial No. 60/138,709 filed Jun. 11, 1999.

STATEMENT REGARDING FEDERALLY SPONSORED RESEARCH OR DEVELOPMENT

Not Applicable

REFERENCE TO MICROFICHE APPENDIX

Not Applicable

BACKGROUND OF THE INVENTION

1. Field of the Invention

This invention relates to disk drive suspensions, and more particularly to disk drive suspension load beams that are more easily manufactured to exacting specifications, such as more precise spring rates (vertical stiffness of the load beam) and 1st torsion values. In a particular aspect, a difficult to control variant in the manufacturing process, the spring portion-etching step to reduce the spring portion thickness relative to the rest of the load beam, is eliminated. The invention provides an interrupted load beam in which the original spring portion of the load beam is removed and the metal layer of a flexible conductor laminate substituted for that original spring portion of the load beam. This metal layer is precise in thickness and thus highly predictable in performance. The invention provides the suspension apparatus, the method of making the suspension apparatus, and the method of applying force to a slider by means of the novel spring arrangement of the apparatus.

2. Description of the Related Art

Suspension load beams are well known and typically have a base portion that attaches to a mount plate connected to an actuator arm, a spring portion and a rigid portion that mounts a flexure and slider for positioning the slider precisely at a selected track on a disk. Rigidity or stiffness in the forward-most beam portion of the load beam is desirable for many performance-related reasons. The spring portion on the other hand is desirably less stiff, especially in relatively short load beams such as 11 mm and 14.5 mm lengths, in order to provide the desired spring rate and 1st torsion values for the suspension. Etching away a part, e.g. 50–70% of the load beam spring portion thickness is the expedient commonly employed to reduce thickness Partial etching of the very thin load beam is problematical because precise control of the etching process is not readily achieved. Etching tolerances of as much as 20% are required. Because spring rate change is the cube of a change in thickness, the noted etched thickness tolerance can produce as much as a 70% change in spring rate, and a 20–40% change in the $1^{st}$ torsion value.

BRIEF SUMMARY OF THE INVENTION

It is an object, therefore, of the invention to provide an improved disk drive suspension having an interrupted load beam. It is a further object to provide a load beam of improved design. A further object is to provide a load beam in which the spring portion thickness is precisely controlled and achieved without etching. Yet another object is to use the steel layer or metal foil forming a part of the flexible conductor laminate of the wireless suspension to provide a spring portion to the load beam, the original load beam spring portion having been removed as part of the load beam forming process. A further object is to provide a method of manufacturing load beams in which the thickness of the rigid or beam portion is unrelated to the thickness in the spring portion. A still further object is to provide a load beam having precisely controlled thickness in the spring portion, and greater thickness in the rigid or beam portion.

These and other objects of the invention to become apparent hereinafter are realized in an interrupted load beam having a base portion and a rigid portion spaced from each other across an interruption along the length of the load beam, a flexible conductor flexure attached to the load beam, the flexible conductor flexure comprising conductive traces, an insulating dielectric and a spring metal layer, the flexible conductor spring metal layer being attached to the load beam base portion and to the load beam rigid portion to join the rigid portion to the base portion in springing relation.

In this and like embodiments, typically, the load beam base portion has a projecting section extending in parallel with the load beam, and includes also an elongated mount plate arranged to overlie the base beam projecting section, the flexible conductor has a distal end, the flexible conductor distal end comprising an open frame formed from the flexible conductor spring metal layer and a flexure tongue supported by the frame for carrying a slider, the flexible conductor comprises a laminate of the spring metal layer, the insulating dielectric and the conductive traces, the insulating dielectric and the conductive traces traversing the load beam interruption in flexible conductor spring metal layer supported relation, and the insulating dielectric and conductive traces are bifurcated forwardly of the load beam interruption and along the length of the load beam rigid portion, and rejoined at the flexure frame.

In a further embodiment, the invention provides a disk drive suspension comprising a flexure and an axially elongated load beam of a predetermined thickness, the flexure being adapted to carry a slider and comprising a flexible laminate of a spring metal layer of less thickness than the load beam predetermined thickness, a dielectric layer, and one or more pairs of insulated conductive traces disposed on the dielectric layer, the load beam having a base portion for mounting the load beam to an actuator and a rigid portion, the rigid portion being spaced from the base portion to define an interruption along the axial length of the load beam, the flexure being attached to the load beam rigid portion, the flexure spring metal layer having a continued extent extending over and beyond the load beam rigid portion and over the load beam base portion, the spring metal layer continued extent being fixed to the load beam base portion and to the load beam rigid portion on opposite sides of the load beam interruption to springingly couple the load beam portions together.

In this and like embodiments, typically, the flexible laminate flexure has a distal end comprising an open frame formed from the flexible laminate spring metal layer and a flexure tongue supported by the frame for carrying a slider, the flexible laminate insulating dielectric and conductive traces traverse the load beam interruption in flexible laminate spring metal layer supported relation, the insulating dielectric and conductive traces are bifurcated forwardly of the load beam interruption and along the length of the load beam rigid portion, and rejoined at the flexure frame, and the load beam rigid portion is free of edge rails.

In its method aspects the invention provides a method of manufacturing a disk drive suspension comprising a load beam and a flexible conductor that defines a flexure, including etching from a web a load beam having a base portion, a spring portion and a rigid portion, etching away a part of the spring portion, attaching to the load beam the flexible conductor in flexure-defining relation, the flexible conductor comprising a laminate of a spring metal layer, a dielectric layer and insulated conductive traces, the flexible conductor having its the spring metal layer attached to the load beam base portion adjacent the spring portion and to the load beam rigid portion adjacent the spring portion with its the dielectric layer and conductive traces traversing the spring portion, and etching away the balance of the spring portion so that the sole spring connection between the base portion and the rigid portion is the flexible conductor spring metal layer that also forms the flexure.

In this embodiment, typically, there is further included shaping the load beam spring portion to have lateral extensions extending beyond the lateral edges of the base portion and the rigid portion, etching away all of the spring portion except the lateral extensions, and etching away the lateral extensions after attaching the flexible conductor to the load beam base and rigid portions; welding at laterally and longitudinally distributed locations adjacent the locus of the load beam spring portion the flexible conductor spring metal layer to the load beam base portion and to the load beam rigid portion, and maintaining the flexible conductor spring metal layer generally free of dielectric layer and conductive traces in the locations of welding of the spring metal layer to the load beam base and rigid portions.

In a further embodiment, the invention provides a method of applying a load on a slider carried by a disk drive suspension comprising a load beam having a base portion and a rigid portion spaced across an interruption where the load beam spring portion was located, including spring coupling the load beam base and rigid portions with a spring metal layer from a flexible conductor comprising the spring metal layer, a dielectric layer and conductive traces in lieu of the original spring portion of the load beam, and applying a force to the slider from the flexible conductor spring metal layer, and forming a flexure for supporting the slider from the flexible conductor.

BRIEF DESCRIPTION OF THE SEVERAL VIEWS OF THE DRAWINGS

The invention will be further described in conjunction with the attached drawings in which:

FIG. 2 is a detailed fragmentary view thereof after removing the original spring portion completely;

FIG. 3 is a side elevation view of the suspension; and,

DETAILED DESCRIPTION OF THE INVENTION

Figure 4:
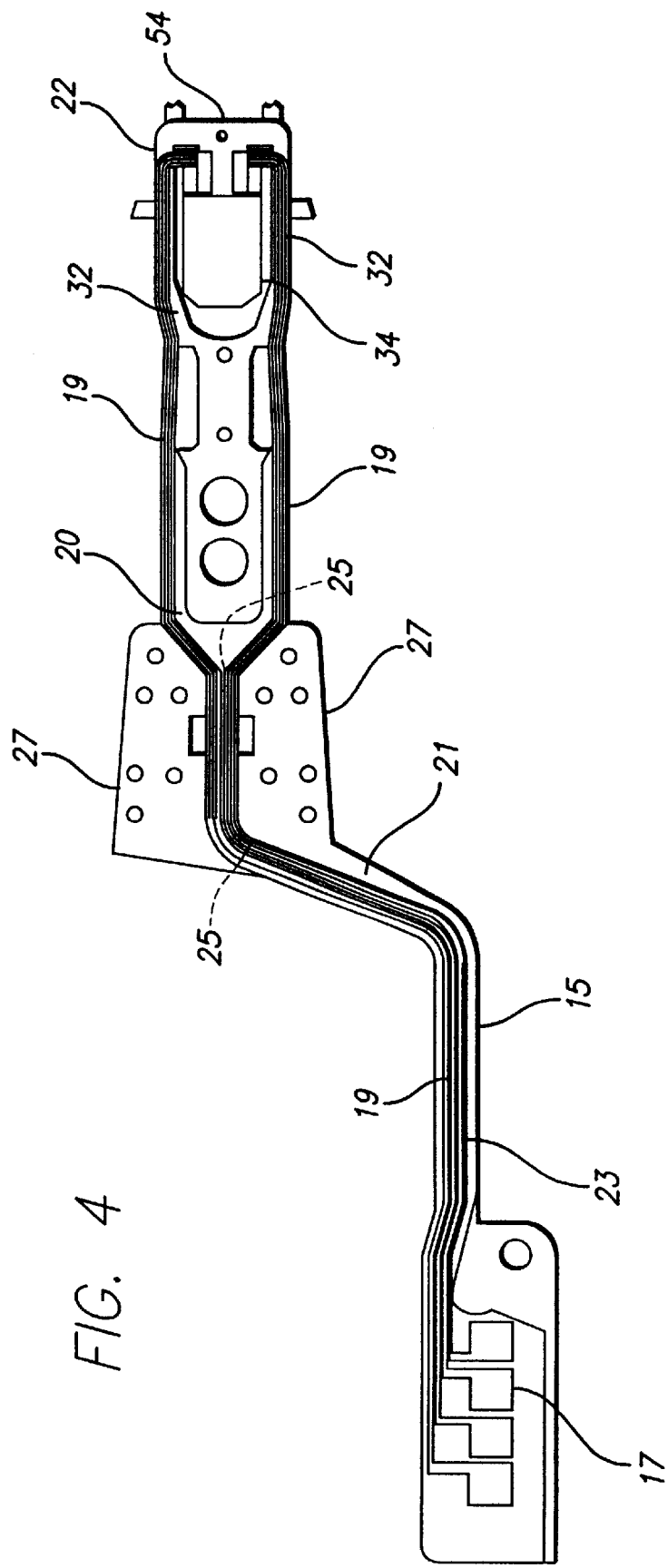
FIG. 4 is a view like FIG. 1 but showing only the flexible conductor and flexure.

With reference to the drawings in detail, in FIGS. 1–4 the suspension 10 comprises a spring metal load beam 12 of any length but typically between about 11 mm and 14.5 mm or as much as the conventional 18 mm length. Load beam 12 has a base portion 14 and a rigid portion 16 spaced from each other across a gap or interruption 18 as indicated along the length of the load beam. Flexible conductor 15 extends from the electrical contact pads 17 at the load beam base portion 14 to the load beam rigid portion 16 traversing the spring portion locus 24 with plural trace conductors 19. The trace conductors 19 are split at 20 to extend along both the left and the right hand sides of the rigid portion 16. The flexible conductor 15 has in addition to the trace conductors 19 a stainless steel foil spring layer 21 and a dielectric layer 23 that insulates the trace conductors from the steel layer. The flexible conductor 15 is subjected to a number of processing operations that result in the steel layer 21 being shaped as best shown in FIG. 4, where the steel layer is shown shaped to define a flexure 22 comprising an open frame 32 and a tongue 34 disposed cantilevered therein for supporting a slider 35. Flexure 22 is attached to the load beam 12 at load beam distal end 28. The flexible conductor (non-flexure parts) is also attached at various points along the load beam 12. The steel layer 21 is free of dielectric layer 23 and trace conductors 19 except along its centerline 25 on the load beam rigid portion 16. On either side of the centerline 25 the steel layer extends outward to form lateral areas 27 that overlie the load beam rigid portion 16 and the load beam base portion 14 traversing the gap or interruption 18. That is, steel layer lateral areas 27 lie in a plane parallel to the plane of the load beam rigid portion 16 and extend over the rigid portion, across interruption 18 and over the distal end 38 of the base portion 14. The steel layer comprises a spring metal typically of a thickness of 0.0008 and 0.0012 inch in a pico size suspension which is a thickness that is desirable for the spring portion of a pico size suspension load beam but not for the beam or rigid portion 16 thereof that must be stiffer and thus thicker for a given steel. The rigid portion 16 thickness required or desired is typically too great for the spring portion 30 to perform ideally without etching reduction. Thus, in the invention the original spring portion 30 at locus 24 is removed.

Figure 1:
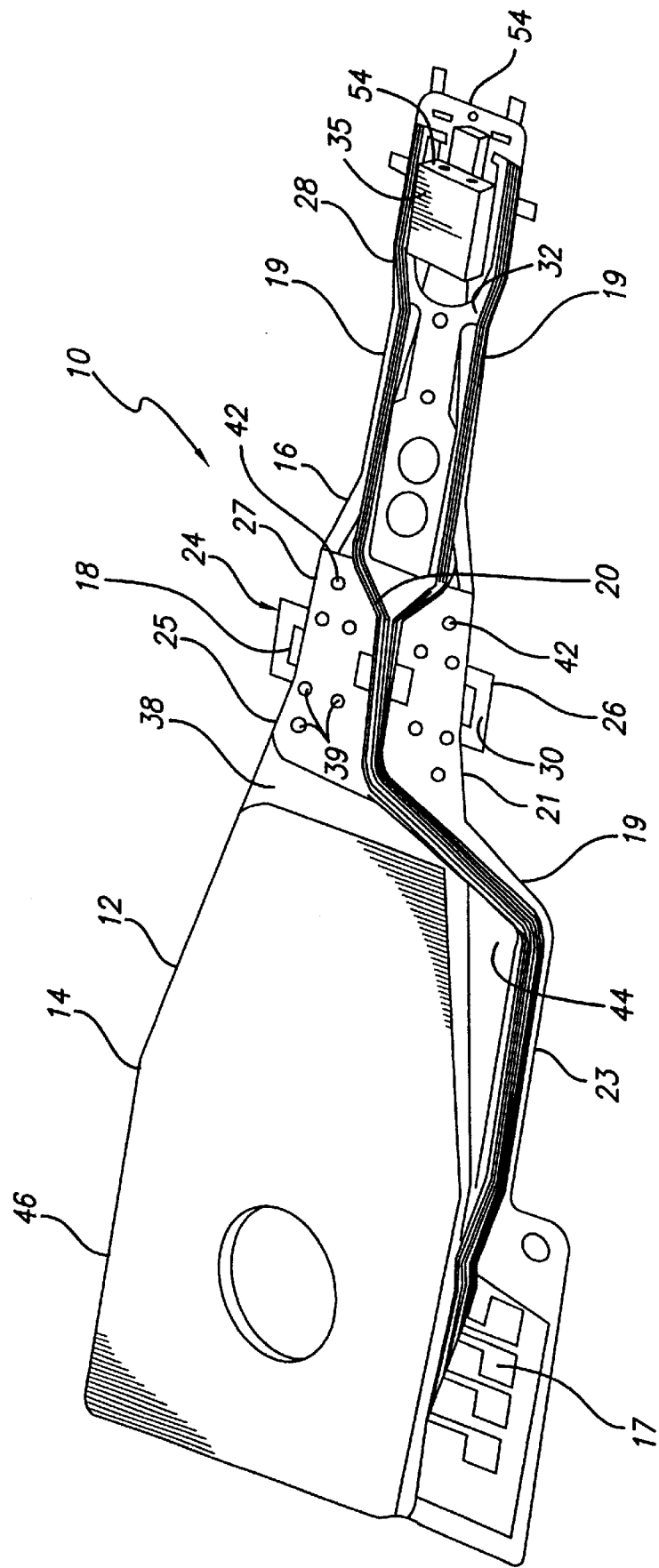
FIG. 1 is an oblique view of the suspension according to the invention, after attaching the flexible conductor and flexure combination, after partially removing the original spring portion of the load beam, and before completely removing the spring portion, viewed from the front or slider side.

In FIG. 1 the spring portion locus 24 is shown as it appears following removal of part, that is, essentially all, of the spring portion 16 leaving only the lateral extensions 26 of the spring portion 30. Before removal of the indicated part of the spring portion 30, the flexible conductor 15 including its flexure 22 noted above to be attached to the load beam 12 at the load beam distal end 28 is further attached to the load beam at its lateral areas 27 by laterally and longitudinally distributed series of welds 39 on the base portion 14 and a like series of welds 42 on the rigid portion 16. The welds 39, 42 are closely adjacent the spring portion locus 24 to firmly support the flexible conductor 15 lateral areas in position and to the degree necessary for the steel layer 21 of the flexible circuit 15 to function as a spring exerting a gram-load force on the rigid portion 16 to position the slider.

The load beam base portion 14 has a projecting section 44 extending in parallel with the load beam 12. An elongated mount plate 46 is arranged to overlie the base projecting section.

Load beam 12 in shorter versions can dispense with edge rails, but such rails may be desirable where the beam length is about 18 mm.

To electrically couple the suspension electronics (not shown) to the slider transducer (not shown), the trace conductors 19 extend from contact pads 17 to the flexure frame 32 for connection to slider contact pads 54, traversing the load beam interruption 18 as a part of the laminate of flexible conductor 15.

The invention method includes etching from a web the load beam 12 to have base portion 14, a spring portion 30 and a rigid portion 16. The spring portion 30 is then etched away leaving the lateral extensions 26 in the spring portion locus 24. At this point the suspension 10 has the appearance shown in FIGS. 1. The lateral extensions 26 are then etched away, leaving the appearance shown in FIG. 2, after attaching to the load beam 12 the flexible conductor 15 including flexure 22 to support the physical relation of the base portion 14 and the rigid portion 16 of the load beam in the absence of the spring portion 30. The flexible conductor steel layer lateral areas 27 are welded as noted above on either side of interruption 18 at locus 24. The sole spring connection between the base portion 14 and the rigid portion 16 is thus the steel layer portion of the flexible conductor 15, and its insulated trace conductors 19.

The novel load beam obtained is useful for applying a load on a slider carried by the disk drive suspension.

The invention thus provides an improved disk drive suspension having an interrupted load beam in which the spring portion thickness is precisely controlled and achieved without etching a controlled reduction in thickness of the load beam spring portion. The use of the steel layer of the flexible conductor to provide a spring portion to the load beam, the original load beam spring portion having been removed as part of the load beam forming process enables exacting control of thickness and thus stiffness and $1^{st}$ torsion values without the vagaries introduced by attempting to etch a reduction in the load beam spring portion thickness. The invention method of makes the thickness of the rigid or beam portion unrelated to the thickness of the spring portion and gives greater stiffness where required without suffering the consequences of undue stiffness elsewhere. The foregoing objects are thus met.

I claim:

1. An interrupted load beam having a base portion and a rigid portion spaced from each other across an interruption along the length of said load beam, a flexible conductor flexure attached to said load beam, said flexible conductor flexure comprising conductive traces, an insulating dielectric and a spring metal layer, said flexible conductor spring metal layer being attached to said load beam base portion and to said load beam rigid portion to join said rigid portion to said base portion in springing relation.

2. The interrupted load beam according to claim 1, in which said flexible conductor has a distal end, said flexible conductor distal end comprising an open frame formed from said flexible conductor spring metal layer and a flexure tongue supported by said frame for carrying a slider.

3. The interrupted load beam according to claim 2, in which said flexible conductor comprises a laminate of said spring metal layer, said insulating dielectric and said conductive traces, said insulating dielectric and said conductive traces traversing said load beam interruption in flexible conductor spring metal layer supported relation.

4. The interrupted load beam according to claim 3, in which said insulating dielectric and conductive traces are bifurcated forwardly of said load beam interruption and along the length of said load beam rigid portions, and rejoined at said flexure frame.

5. The interrupted load beam according to claim 1, in which said load beam rigid portion is free of edge rails.

6. An interrupted load beam having a base portion and a rigid portion spaced from each other across an interruption along the length of said load beam, a flexible conductor flexure attached to said load beam, said flexible conductor flexure comprising conductive traces, an insulating dielectric and a spring metal layer, said flexible conductor spring metal layer being attached to said load beam base portion and to said load beam rigid portion to join said rigid portion to said base portion in springing relation, said load beam base portion having a projecting section extending in parallel with said load beam, and an elongated mount plate arranged to overlie said base beam projecting section.

7. A disk drive suspension comprising a flexure and an axially elongated load beam of a predetermined thickness, said flexure being adapted to carry a slider and comprising a flexible laminate of a spring metal layer of less thickness than said load beam predetermined thickness, a dielectric layer, and one or more pairs of insulated conductive traces disposed on said dielectric layer, said load beam having a base portion for mounting said load beam to an actuator and a rigid portion, said rigid portion being spaced from said base portion to define an interruption along the axial length of said load beam, said flexure being attached to said load beam rigid portion, said flexure spring metal layer having a continued extent extending over and beyond said load beam rigid portion and over said load beam base portion, said spring metal layer continued extent being fixed to said load beam base portion and to said load beam rigid portion on opposite sides of said load beam interruption to springingly couple said load beam portions together.

8. The interrupted load beam according to claim 7, in which said flexible laminate flexure has a distal end comprising an open frame formed from said flexible laminate spring metal layer and a flexure tongue supported by said frame for carrying a slider.

9. The interrupted load beam according to claim 8, in which said flexible laminate insulating dielectric and conductive traces traverse said load beam interruption in flexible laminate spring metal layer supported relation.

10. The interrupted load beam according to claim 9, in which said insulating dielectric and conductive traces are bifurcated forwardly of said load beam interruption and along the length of said load beam rigid portion, and rejoined at said flexure frame.

11. The interrupted load beam according to claim 10, in which said load beam rigid portion is free of edge rails.

12. A disk drive suspension comprising a flexure and an axially elongated load beam of a predetermined thickness, said flexure being adapted to carry a slider and comprising a flexible laminate of a spring metal layer of less thickness than said load beam predetermined thickness, a dielectric layer, and one or more pairs of insulated conductive traces disposed on said dielectric layer, said load beam having a base portion for mounting said load beam to an actuator and a rigid portion, said rigid portion being spaced from said base portion to define an interruption along the axial length of said load beam, said flexure being attached to said load beam rigid portion, said flexure spring metal layer having a continued extent extending over and beyond said load beam rigid portion and over said load beam base portion, said spring metal layer continued extent being fixed to said load beam base portion and to said load beam rigid portion on opposite sides of said load beam interruption to springingly couple said load beam portions together, said load beam base portion having a projecting section extending in parallel with said load beam, and an elongated mount plate arranged to overlie said base beam projecting section.

13. A method of manufacturing a disk drive suspension comprising a load beam and a flexible conductor that defines a flexure, including etching from a web a load beam having a base portion, a spring portion and a rigid portion, etching away a part of said spring portion, attaching to said load beam said flexible conductor in flexure-defining relation, said flexible conductor comprising a laminate of a spring metal layer, a dielectric layer and insulated conductive traces, said flexible conductor having its said spring metal layer attached to said load beam base portion adjacent said spring portion and to said load beam rigid portion adjacent said spring portion with its said dielectric layer and conductive traces traversing said spring portion, and etching away the balance of said spring portion so that the sole spring connection between said base portion and said rigid portion is said flexible conductor spring metal layer that also forms said flexure.

14. A method of manufacturing a disk drive suspension comprising a load beam and a flexible conductor that defines a flexure, including etching from a web a load beam having a base portion, a spring portion and a rigid portion, etching away a part of said spring portion, attaching to said load beam said flexible conductor in flexure-defining relation, said flexible conductor comprising a laminate of a spring metal layer, a dielectric layer and insulated conductive traces, said flexible conductor having its said spring metal layer attached to said load beam base portion adjacent said spring portion and to said load beam rigid portion adjacent said spring portion with its said dielectric layer and conductive traces traversing said spring portion, shaping said load beam spring portion to have lateral extensions extending beyond the lateral edges of said base portion and said rigid portion, etching away all of said spring portion except said lateral extensions, and etching away said lateral extensions after attaching said flexible conductor to said load beam base and rigid portions, so that the sole spring connection between said base portion and said rigid portion is said flexible conductor spring metal layer that also forms said flexure.

15. The method according to claim 14, including also welding at laterally and longitudinally distributed locations adjacent the locus of said load beam spring portion said flexible conductor spring metal layer to said load beam base portion and to said load beam rigid portion.

16. The method according to claim 15, including also maintaining said flexible conductor spring metal layer generally free of dielectric layer and conductive traces in the locations of welding of said spring metal layer to said load beam base and rigid portions.

17. The method of applying a load on a slider carried by a disk drive suspension comprising a load beam having a base portion and a rigid portion spaced across an interruption where the load beam spring portion was located, including spring coupling said load beam base and rigid portions with a spring metal layer from a flexible conductor comprising said spring metal layer, a dielectric layer and conductive traces in lieu of the original spring portion of said load beam, and applying a force to said slider from said flexible conductor spring metal layer.

18. The method according to claim 17, including also forming a flexure for supporting said slider from said flexible conductor.

\* \* \* \* \*